Patented Aug. 25, 1925.

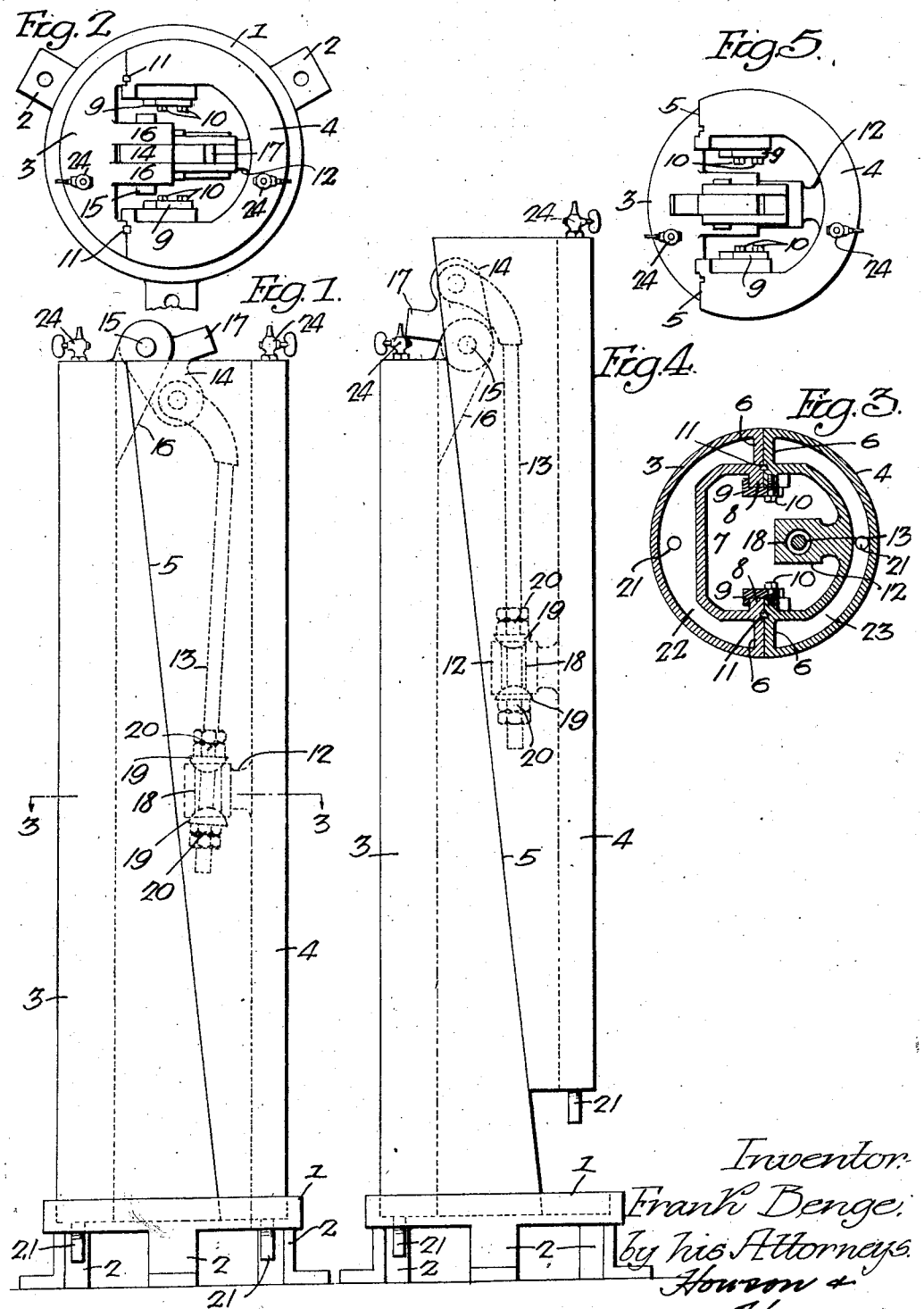

1,551,363

UNITED STATES PATENT OFFICE.

FRANK BENGE, OF BRIDGEPORT, PENNSYLVANIA, ASSIGNOR TO DIAMOND STATE FIBRE COMPANY, OF BRIDGEPORT, PENNSYLVANIA, A CORPORATION OF DELAWARE.

TUBE-DRYING DEVICE.

Application filed March 24, 1925. Serial No. 18,070.

*To all whom it may concern:*

Be it known that I, FRANK BENGE, a citizen of the United States of America, residing in Bridgeport, Montgomery County, Pennsylvania, have invented a Tube-Drying Device, of which the following is a specification.

The principal object of this invention is to provide a device for facilitating the drying of wet tubular objects, and the invention has a particular application to the manufacture of vulcanized and other fibre tubing.

A more specific object is to provide a heated form of novel construction such that the form may be adjusted to different diameters permitting in a contracted condition the passage of a wet tube onto the form and in the expanded condition conforming accurately to the inner diameter of the tube so that the entire surface of the latter is brought into intimate contact with the heated sides of the form.

The invention further resides in certain novel and advantageous details of construction as hereinafter clearly described and as illustrated in the attached drawings, in which:

Figure 1 is an elevation of a device made in accordance with my invention showing the latter in the normal expanded and operative position;

Fig. 2 is a plan view of the device as shown in Fig. 1;

Fig. 3 is a section on the line 3—3, Fig. 1;

Fig. 4 is an elevation of the device in its contracted or tube-receiving position, and Fig. 5 is a plan view of the device as shown in Fig. 4.

With reference to the drawings, my device in a preferred form comprises a base 1, the base comprising in the present instance integral feet or pedestals 2, by means of which the base proper is secured to the supporting surface and elevated thereabove.

Suitably secured to the base is a relatively fixed form member 3 constituting one part of a longitudinally divided cylinder whose other part is constituted by a relatively movable form member 4. The two form members 3 and 4, as clearly illustrated, are so constructed that when placed together, as shown in Figs. 1 and 2, they take a completely cylindrical form, this cylinder being divided on a plane 5 inclined to the normal longitudinal axis of the cylinder.

As shown in Figs. 2 and 3, the two parts 3 and 4 are hollow, and their inner faces, except for longitudinal sections 6 at each side, which constitute the abutting faces of the parts, are concaved to provide a central longitudinal chamber 7.

As shown in Fig. 3, the part 3 is provided with a longitudinal flange 8 projecting at each side thereof into the chamber 7, and L-shaped clamps 9, 9, are secured to the part 4, by means in the present instance of bolts 10, and embrace the flanges 8, 8, in such manner as to hold the parts together while permitting a longitudinal relative sliding movement along the faces of the abutting sections 6.

To further insure a proper relative positioning of the parts, the abutting faces may be grooved in registration to provide keyways for keys 11.

It will be apparent that with the foregoing arrangement, the relatively movable part 4 is adapted to slide vertically on the inclined abutting surface of the relatively fixed part 3, and that with the part 4 elevated, as shown in Fig. 4, the diameter of the cylinder formed by the outer surfaces of the parts 3 and 4 is less than the diameter of the cylinder when the part 4 is in the normal position shown in Fig. 1.

In providing for the aforedescribed relative movement of the parts 3 and 4, I provide on the inside of the part 4 a lug 12 to which is secured a rod or shaft 13, the latter extending upwardly in the chamber 7 and having pivotal connection at its upper end with a link 14, which link is also pivotally secured, by means of a pin 15, between a bifurcated lug 16 upon the part 3. The link also comprises an extension 17 constituting a means for securing a suitable lever or handle thereto, and when the link is turned around the pivot 15, in a counter-clockwise direction from the position shown in Fig. 1, toward the position shown in Fig. 4, the part 4 of the form is elevated, as clearly illustrated. In order to provide for the relative movement betwen the rod 13 and the part 4, the connection between the rod and the lug 12 may be a flexible one, this connection in the present instance being formed by passing the rod through a central vertical aperture 18 in the said lug whose diameter is greater than the diameter of the rod 13 and providing upon the rod semispherical bearing members 19, 19, which seat in the upper and lower ends of the said aperture 18, as clearly illustrated, the elements 19 being held to their seats by means of nuts 20 on the said rod.

As illustrated, means is provided at the bottom of each of the parts 3 and 4, in the form in the present instance of nipples 21, 21, which open into the interior chambers 22 and 23 respectively of the parts 3 and 4 for introducing steam or other heating medium to these chambers, and a pet cock 24 is provided at the top of each of the parts 3 and 4 for blowing out the said chambers 22 and 23 when this becomes necessary. Each of the nozzles 21 may be connected to a suitable source of heating fluid by a hose or pipe line (not shown), and in order to provide for the movement of the part 4, the duct attaching to that part may be made in part flexible.

In operation, the parts are adjusted to the position shown in Fig. 4, and the wet tubes after removal from the forming mandrels are passed down over the top of the contracted form. The form is then expanded by lowering the part 4 to the position shown in Fig. 1, the form heated by the heating medium in the inner chambers 22 and 23 quickly drying the tube.

The device has been found to greatly facilitate the drying of tubular articles, and has been particularly useful in the manufacture of fibre tubing.

I claim:

1. A drying form comprising two relatively movable parts forming together a cylindrical body and slidably contacting on surfaces extending at an angle to the longitudinal axis of the cylinder, means for heating said parts, and means for relatively sliding said parts along the contacting surfaces to contract or expand the cylinder.

2. A drying form consisting of two hollow parts constituting the complementary parts of a longitudinally divided cylinder, means for holding said parts together in cylinder forming relation, said securing means permitting relative longitudinal movement of said parts along their contacting surfaces, interconnecting elements connected to said parts and constituting means for relatively moving said parts, and means for introducing a heating medium into the interior of said parts.

3. A drying form comprising two relatively movable parts constituting together complementary portions of a longitudinally divided cylinder, said parts being longitudinally slidable on their contacting faces and at least one of said parts being interiorly recessed from one end, and mechanism occupying said recess and providing means for relatively moving said parts.

4. A drying form comprising a plurality of parts constituting complementary portions of a longitudinally divided cylinder, said parts being relatively slidable along their contacting faces and at least one of said parts being interiorly recessed from one end, and elements housed within said recess for interconnecting said parts and providing means for relatively moving said parts, and an actuating lever for said elements projecting beyond the edges of said form.

FRANK BENGE.